United States Patent
Versteyhe

(10) Patent No.: US 9,556,943 B2
(45) Date of Patent: Jan. 31, 2017

(54) IVT BASED ON A BALL-TYPE CVP INCLUDING POWERSPLIT PATHS

(71) Applicant: DANA LIMITED, Maumee, OH (US)

(72) Inventor: Mark R. J. Versteyhe, Oostkamp (BE)

(73) Assignee: Dana Limited, Maumee, OH (US)

( * ) Notice: Subject to any disclaimer, the term of this patent is extended or adjusted under 35 U.S.C. 154(b) by 171 days.

(21) Appl. No.: 14/426,113

(22) PCT Filed: Sep. 5, 2013

(86) PCT No.: PCT/US2013/058318
§ 371 (c)(1),
(2) Date: Jun. 23, 2015

(87) PCT Pub. No.: WO2014/039713
PCT Pub. Date: Mar. 13, 2014

(65) Prior Publication Data
US 2015/0252881 A1    Sep. 10, 2015

Related U.S. Application Data

(60) Provisional application No. 61/697,960, filed on Sep. 7, 2012, provisional application No. 61/784,255, filed on Mar. 14, 2013.

(51) Int. Cl.
*F16H 37/08*    (2006.01)

(52) U.S. Cl.
CPC .......... *F16H 37/086* (2013.01); *F16H 37/084* (2013.01); *F16H 2037/088* (2013.01); *F16H 2200/201* (2013.01); *F16H 2200/2007* (2013.01); *F16H 2200/2035* (2013.01)

(58) Field of Classification Search
CPC .................. F16H 37/086; F16H 37/084; F16H 2200/2007; F16H 2200/2035; F16H 2037/088
USPC .................................. 475/210, 211, 214–219
See application file for complete search history.

(56) References Cited

U.S. PATENT DOCUMENTS

| 1,063,244 | A | 6/1913 | Ludwig |
| 1,215,969 | A | 2/1917 | Murray |
| 1,526,140 | A | 2/1925 | Gruver |
| 2,019,006 | A | 10/1935 | Ferrarl |

(Continued)

FOREIGN PATENT DOCUMENTS

| AU | 2011224083 A1 | 10/2011 |
| CN | 101392825 A | 3/2009 |

(Continued)

OTHER PUBLICATIONS

Co-pending U.S. Appl. No. 15/209,487, filed Jul. 13, 2016.

(Continued)

*Primary Examiner* — Roger Pang
(74) *Attorney, Agent, or Firm* — Marshall & Melhorn, LLC

(57) ABSTRACT

A variable transmission includes an input shaft, two planetary gear sets, a first planetary set on the input side of a variator, and a second planetary set on the output side of the variator, to split the torque drivingly engaged with a variator comprising, a first ring assembly, a second ring assembly; various arrangements of brakes and clutches; a gearbox; and the output shaft to produce transmissions with continuously variable or infinitely variable torque output ratios.

20 Claims, 3 Drawing Sheets

(56) References Cited

U.S. PATENT DOCUMENTS

| | | | |
|---|---|---|---|
| 2,060,884 A | 11/1936 | Madle | |
| 2,148,759 A | 2/1939 | Le Grand | |
| 2,405,201 A | 8/1946 | Franck | |
| 2,660,897 A | 12/1953 | Neidhart et al. | |
| 2,729,118 A | 1/1956 | Emslie | |
| 2,931,235 A | 4/1960 | Hayward | |
| 3,203,278 A | 8/1965 | General | |
| 3,376,633 A | 4/1968 | Wesley | |
| 3,407,687 A | 10/1968 | Hayashi | |
| 3,470,720 A | 10/1969 | Eklund et al. | |
| 3,505,718 A | 4/1970 | Carlstrom | |
| 3,583,060 A | 6/1971 | Sigmans | |
| 3,688,600 A | 9/1972 | Allan | |
| 3,722,324 A * | 3/1973 | Cordner | F16H 47/04 475/75 |
| 3,765,270 A | 10/1973 | Lemieux | |
| 3,774,280 A | 11/1973 | Eklund et al. | |
| 3,831,245 A | 8/1974 | Amos | |
| 3,894,559 A | 7/1975 | Depuy | |
| 4,046,988 A | 9/1977 | Okuda et al. | |
| 4,056,988 A | 11/1977 | Kubo et al. | |
| 4,187,709 A | 2/1980 | Legate et al. | |
| 4,226,140 A | 10/1980 | Gaasenbeek | |
| 4,333,358 A | 6/1982 | Grattapaglia | |
| 4,344,336 A | 8/1982 | Carriere | |
| 4,360,090 A | 11/1982 | Wonn | |
| 4,368,572 A | 1/1983 | Kanazawa et al. | |
| 4,464,952 A | 8/1984 | Stubbs | |
| 4,693,134 A | 9/1987 | Kraus | |
| 4,731,044 A | 3/1988 | Mott | |
| 4,756,211 A | 7/1988 | Fellows | |
| 4,784,017 A | 11/1988 | Johnshoy | |
| 4,856,371 A | 8/1989 | Kemper | |
| 4,856,374 A | 8/1989 | Kreuzer | |
| 4,950,208 A | 8/1990 | Tomlinson | |
| 4,963,122 A | 10/1990 | Ryan | |
| 4,963,124 A | 10/1990 | Takahashi et al. | |
| 4,994,002 A * | 2/1991 | Valotto | F16H 47/04 475/72 |
| 5,109,962 A | 5/1992 | Sato | |
| 5,168,778 A | 12/1992 | Todd et al. | |
| 5,217,412 A | 6/1993 | Indlekofer et al. | |
| 5,230,670 A | 7/1993 | Hibi | |
| 5,238,460 A | 8/1993 | Esaki et al. | |
| 5,318,486 A | 6/1994 | Lutz | |
| 5,390,759 A | 2/1995 | Gollner | |
| 5,401,221 A | 3/1995 | Fellows et al. | |
| 5,520,588 A | 5/1996 | Hall, III | |
| 5,527,231 A | 6/1996 | Seidel et al. | |
| 5,577,423 A | 11/1996 | Mimura | |
| 5,599,251 A | 2/1997 | Beim et al. | |
| 5,659,956 A | 8/1997 | Braginsky et al. | |
| 5,683,322 A | 11/1997 | Meyerle | |
| 5,726,353 A | 3/1998 | Matsuda et al. | |
| 5,730,678 A | 3/1998 | Larkin | |
| 5,766,105 A | 6/1998 | Fellows et al. | |
| 5,776,028 A | 7/1998 | Matsuda et al. | |
| 5,800,303 A | 9/1998 | Benford | |
| 5,860,888 A | 1/1999 | Lee | |
| 5,915,801 A | 6/1999 | Taga et al. | |
| 5,961,415 A | 10/1999 | Justice et al. | |
| 5,971,883 A | 10/1999 | Klemen | |
| 5,996,226 A | 12/1999 | Gibbs | |
| 6,009,365 A | 12/1999 | Takahara et al. | |
| 6,036,616 A | 3/2000 | McCarrick et al. | |
| 6,045,477 A | 4/2000 | Schmidt | |
| 6,053,839 A | 4/2000 | Baldwin et al. | |
| 6,059,685 A | 5/2000 | Hoge et al. | |
| 6,071,208 A | 6/2000 | Koivunen | |
| 6,080,080 A | 6/2000 | Bolz et al. | |
| 6,083,135 A | 7/2000 | Baldwin et al. | |
| 6,086,504 A | 7/2000 | Illerhaus | |
| 6,089,287 A | 7/2000 | Welsh et al. | |
| 6,095,942 A | 8/2000 | Yamaguchi et al. | |
| 6,155,951 A | 12/2000 | Kuhn et al. | |
| 6,217,474 B1 | 4/2001 | Ross et al. | |
| 6,251,038 B1 | 6/2001 | Ishikawa et al. | |
| 6,273,838 B1 | 8/2001 | Park | |
| 6,342,026 B1 | 1/2002 | Takagi et al. | |
| 6,358,178 B1 | 3/2002 | Wittkopp | |
| 6,371,880 B1 | 4/2002 | Kam | |
| 6,405,117 B1 | 6/2002 | Walenty et al. | |
| 6,481,258 B1 | 11/2002 | Belinky | |
| 6,554,735 B2 | 4/2003 | Kanazawa | |
| 6,558,285 B1 | 5/2003 | Sieber | |
| 6,585,619 B2 | 7/2003 | Henzler | |
| 6,609,994 B2 | 8/2003 | Muramoto | |
| 6,632,157 B1 | 10/2003 | Gierling et al. | |
| 6,641,497 B2 | 11/2003 | Deschamps et al. | |
| 6,645,106 B2 | 11/2003 | Goo et al. | |
| 6,689,012 B2 | 2/2004 | Miller et al. | |
| 6,705,964 B2 | 3/2004 | Nagai et al. | |
| 6,719,659 B2 | 4/2004 | Geiberger et al. | |
| 6,723,016 B2 | 4/2004 | Sumi | |
| 6,726,590 B2 | 4/2004 | Henzler et al. | |
| 6,733,412 B2 | 5/2004 | Kumagai et al. | |
| 6,752,696 B2 | 6/2004 | Murai et al. | |
| 6,793,603 B2 | 9/2004 | Teraoka et al. | |
| 6,849,020 B2 | 2/2005 | Sumi | |
| 6,866,606 B2 | 3/2005 | Ooyama | |
| 6,949,045 B2 | 9/2005 | Wafzig et al. | |
| 6,979,275 B2 | 12/2005 | Hiraku et al. | |
| 6,986,725 B2 | 1/2006 | Morscheck | |
| 7,033,298 B2 | 4/2006 | Usoro et al. | |
| 7,074,154 B2 | 7/2006 | Miller | |
| 7,086,981 B2 | 8/2006 | Ali et al. | |
| 7,104,917 B2 | 9/2006 | Klemen et al. | |
| 7,128,681 B2 | 10/2006 | Sugino et al. | |
| 7,160,220 B2 | 1/2007 | Shinojima et al. | |
| 7,186,199 B1 | 3/2007 | Baxter, Jr. | |
| 7,217,214 B2 | 5/2007 | Morscheck et al. | |
| 7,234,543 B2 | 6/2007 | Schaaf | |
| 7,288,044 B2 | 10/2007 | Gumpoltsberger | |
| 7,311,634 B2 | 12/2007 | Shim et al. | |
| 7,335,126 B2 | 2/2008 | Tsuchiya et al. | |
| 7,347,801 B2 | 3/2008 | Guenter et al. | |
| 7,396,309 B2 | 7/2008 | Heitz et al. | |
| 7,431,677 B2 | 10/2008 | Miller et al. | |
| 7,470,210 B2 | 12/2008 | Miller et al. | |
| 7,473,202 B2 | 1/2009 | Morscheck et al. | |
| 7,485,069 B2 | 2/2009 | Jang et al. | |
| 7,497,798 B2 | 3/2009 | Kim | |
| 7,588,514 B2 | 9/2009 | McKenzie et al. | |
| 7,637,838 B2 | 12/2009 | Gumpoltsberger | |
| 7,672,770 B2 | 3/2010 | Inoue et al. | |
| 7,686,729 B2 | 3/2010 | Miller et al. | |
| 7,717,815 B2 | 5/2010 | Tenberge | |
| 7,727,107 B2 | 6/2010 | Miller | |
| 7,780,566 B2 | 8/2010 | Seo | |
| 7,874,153 B2 | 1/2011 | Behm | |
| 7,878,935 B2 | 2/2011 | Lahr | |
| 7,951,035 B2 | 5/2011 | Platt | |
| 7,980,972 B1 | 7/2011 | Starkey et al. | |
| 8,029,401 B2 | 10/2011 | Johnson | |
| 8,052,569 B2 | 11/2011 | Tabata et al. | |
| 8,062,175 B2 | 11/2011 | Krueger et al. | |
| 8,066,614 B2 | 11/2011 | Miller et al. | |
| 8,142,323 B2 | 3/2012 | Tsuchiya et al. | |
| 8,226,518 B2 | 7/2012 | Parraga | |
| 8,257,216 B2 | 9/2012 | Hoffman | |
| 8,257,217 B2 | 9/2012 | Hoffman | |
| 8,287,414 B2 | 10/2012 | Weber et al. | |
| 8,313,404 B2 | 11/2012 | Carter et al. | |
| 8,376,903 B2 | 2/2013 | Pohl et al. | |
| 8,382,636 B2 | 2/2013 | Shiina et al. | |
| 8,447,480 B2 | 5/2013 | Usukura | |
| 8,469,856 B2 | 6/2013 | Thomassy | |
| 8,545,368 B1 | 10/2013 | Davis et al. | |
| 8,594,867 B2 | 11/2013 | Heap et al. | |
| 8,622,871 B2 | 1/2014 | Hoff | |
| 8,639,419 B2 | 1/2014 | Roli et al. | |
| 8,668,614 B2 | 3/2014 | Sherrill et al. | |
| 8,678,975 B2 | 3/2014 | Koike | |
| 8,870,711 B2 | 10/2014 | Pohl et al. | |

(56) References Cited

U.S. PATENT DOCUMENTS

| | | |
|---|---|---|
| 8,888,643 B2 | 11/2014 | Lohr et al. |
| 8,926,468 B2 | 1/2015 | Versteyhe et al. |
| 8,986,150 B2 | 3/2015 | Versteyhe et al. |
| 9,114,799 B2 | 8/2015 | Tsukamoto et al. |
| 9,156,463 B2 | 10/2015 | Legner et al. |
| 2002/0004438 A1 | 1/2002 | Toukura et al. |
| 2002/0094911 A1 | 7/2002 | Haka |
| 2002/0169048 A1 | 11/2002 | Henzler et al. |
| 2003/0060318 A1 | 3/2003 | Sumi |
| 2003/0181280 A1 | 9/2003 | Elser et al. |
| 2003/0200783 A1 | 10/2003 | Shai |
| 2003/0213125 A1 | 11/2003 | Chiuchang |
| 2003/0216121 A1 | 11/2003 | Yarkosky |
| 2003/0228952 A1 | 12/2003 | Joe et al. |
| 2004/0058769 A1 | 3/2004 | Larkin |
| 2004/0061639 A1 | 4/2004 | Voigtlaender et al. |
| 2004/0166984 A1 | 8/2004 | Inoue |
| 2004/0167391 A1 | 8/2004 | Solar et al. |
| 2004/0171452 A1 | 9/2004 | Miller et al. |
| 2005/0102082 A1 | 5/2005 | Joe et al. |
| 2005/0137046 A1 | 6/2005 | Miller et al. |
| 2005/0153810 A1 | 7/2005 | Miller et al. |
| 2006/0094515 A1 | 5/2006 | Szuba et al. |
| 2006/0234822 A1 | 10/2006 | Morscheck et al. |
| 2006/0276294 A1 | 12/2006 | Coffey et al. |
| 2007/0021259 A1 | 1/2007 | Tenberge |
| 2007/0032327 A1 | 2/2007 | Raghavan et al. |
| 2007/0042856 A1 | 2/2007 | Greenwood et al. |
| 2007/0072732 A1 | 3/2007 | Klemen |
| 2007/0096556 A1 | 5/2007 | Kokubo et al. |
| 2007/0270270 A1 | 11/2007 | Miller et al. |
| 2007/0275808 A1 | 11/2007 | Iwanaka et al. |
| 2008/0039273 A1 | 2/2008 | Smithson et al. |
| 2008/0103002 A1 | 5/2008 | Holmes |
| 2008/0121487 A1 | 5/2008 | Miller et al. |
| 2008/0185201 A1 | 8/2008 | Bishop |
| 2009/0017959 A1 | 1/2009 | Triller |
| 2009/0048054 A1 | 2/2009 | Tsuchiya et al. |
| 2009/0062064 A1 | 3/2009 | Kamada et al. |
| 2009/0112424 A1 | 4/2009 | Dahl et al. |
| 2009/0132135 A1 | 5/2009 | Quinn, Jr. et al. |
| 2009/0221391 A1 | 9/2009 | Bazyn et al. |
| 2009/0221393 A1 | 9/2009 | Kassler |
| 2009/0286651 A1 | 11/2009 | Tanaka et al. |
| 2009/0312137 A1 | 12/2009 | Rohs et al. |
| 2010/0056322 A1 | 3/2010 | Thomassy |
| 2010/0093476 A1 | 4/2010 | Carter et al. |
| 2010/0093479 A1 | 4/2010 | Carter et al. |
| 2010/0106386 A1 | 4/2010 | Krasznai et al. |
| 2010/0113211 A1 | 5/2010 | Schneider et al. |
| 2010/0137094 A1 | 6/2010 | Pohl |
| 2010/0141193 A1 | 6/2010 | Rotondo et al. |
| 2010/0244755 A1 | 9/2010 | Kinugasa et al. |
| 2010/0267510 A1 | 10/2010 | Nichols et al. |
| 2010/0282020 A1 | 11/2010 | Greenwood et al. |
| 2010/0304915 A1 | 12/2010 | Lahr |
| 2010/0310815 A1 | 12/2010 | Mendonca et al. |
| 2011/0015021 A1 | 1/2011 | Maguire et al. |
| 2011/0034284 A1 | 2/2011 | Pohl et al. |
| 2011/0152031 A1 | 6/2011 | Schoolcraft |
| 2011/0165982 A1 | 7/2011 | Hoffman et al. |
| 2011/0165985 A1 | 7/2011 | Hoffman et al. |
| 2011/0165986 A1 | 7/2011 | Hoffman et al. |
| 2011/0165987 A1 | 7/2011 | Hoffman et al. |
| 2011/0230297 A1 | 9/2011 | Shiina et al. |
| 2011/0300954 A1 | 12/2011 | Szuba et al. |
| 2011/0319222 A1 | 12/2011 | Ogawa et al. |
| 2012/0024991 A1 | 2/2012 | Pilch et al. |
| 2012/0035016 A1 | 2/2012 | Miller et al. |
| 2012/0040794 A1 | 2/2012 | Schoolcraft |
| 2012/0122624 A1 | 5/2012 | Hawkins, Jr. et al. |
| 2012/0142477 A1 | 6/2012 | Winter |
| 2012/0165154 A1 | 6/2012 | Wittkopp et al. |
| 2012/0231925 A1 | 9/2012 | Shiina et al. |
| 2012/0244990 A1 | 9/2012 | Ogawa et al. |
| 2012/0309579 A1 | 12/2012 | Miller et al. |
| 2013/0096797 A1 | 4/2013 | Whitney et al. |
| 2013/0130859 A1 | 5/2013 | Lundberg et al. |
| 2013/0133965 A1 | 5/2013 | Books |
| 2013/0184115 A1 | 7/2013 | Urabe et al. |
| 2013/0190131 A1 | 7/2013 | Versteyhe et al. |
| 2013/0226416 A1 | 8/2013 | Seipold et al. |
| 2013/0303325 A1 | 11/2013 | Carey et al. |
| 2013/0304344 A1 | 11/2013 | Abe |
| 2013/0338888 A1 | 12/2013 | Long et al. |
| 2014/0194242 A1 | 7/2014 | Cooper |
| 2014/0194243 A1 | 7/2014 | Versteyhe et al. |
| 2014/0223901 A1 | 8/2014 | Versteyhe et al. |
| 2014/0274536 A1 | 9/2014 | Versteyhe et al. |
| 2014/0274540 A1 | 9/2014 | Schoolcraft |
| 2014/0274552 A1 | 9/2014 | Frink et al. |
| 2014/0329637 A1 | 11/2014 | Thomassy et al. |
| 2015/0024899 A1 | 1/2015 | Phillips |
| 2015/0051801 A1 | 2/2015 | Quinn, Jr. et al. |
| 2015/0111693 A1 | 4/2015 | Wang et al. |
| 2015/0198246 A1 | 7/2015 | Callaway et al. |
| 2015/0204429 A1 | 7/2015 | Versteyhe et al. |
| 2015/0204430 A1 | 7/2015 | Versteyhe |
| 2015/0226294 A1 | 8/2015 | Ziech et al. |
| 2015/0226298 A1 | 8/2015 | Versteyhe |
| 2015/0226299 A1 | 8/2015 | Cooper et al. |
| 2015/0354676 A1 | 12/2015 | Versteyhe et al. |
| 2016/0033021 A1 | 2/2016 | Cooper et al. |
| 2016/0047448 A1 | 2/2016 | Versteyhe et al. |
| 2016/0109001 A1 | 4/2016 | Schoolcraft |
| 2016/0123438 A1 | 5/2016 | Ziech et al. |
| 2016/0131235 A1 | 5/2016 | Phillips |
| 2016/0185353 A1 | 6/2016 | Honma et al. |
| 2016/0281828 A1 | 9/2016 | Haka |
| 2016/0290458 A1 | 10/2016 | Taskiran et al. |

FOREIGN PATENT DOCUMENTS

| | | |
|---|---|---|
| CN | 101479503 A | 7/2009 |
| CN | 101617146 A | 12/2009 |
| CN | 102297255 A | 12/2011 |
| CN | 102338208 A | 2/2012 |
| CN | 202165536 U | 3/2012 |
| CN | 202392067 U | 8/2012 |
| DE | 1237380 B | 3/1967 |
| DE | 3245045 A1 | 6/1984 |
| DE | 102005010751 A1 | 9/2006 |
| EP | 0156936 A1 | 10/1985 |
| EP | 0210053 A2 | 1/1987 |
| EP | 1061288 A2 | 12/2000 |
| EP | 1174645 A2 | 1/2002 |
| EP | 2113056 B1 | 7/2012 |
| FR | 796188 A | 3/1936 |
| FR | 1030702 A | 6/1953 |
| FR | 1472282 A | 3/1967 |
| FR | 2185076 A5 | 12/1973 |
| FR | 2280451 A1 | 2/1976 |
| FR | 2918433 A1 | 1/2009 |
| GB | 1127825 A | 9/1968 |
| GB | 2196892 A | 5/1988 |
| GB | 2248895 A | 4/1992 |
| JP | H09119506 A | 5/1997 |
| JP | 2008180214 A | 8/2008 |
| JP | 2009058085 A | 3/2009 |
| JP | 2011153583 A | 8/2011 |
| WO | WO-2006002457 A1 | 1/2006 |
| WO | WO-2006041718 A2 | 4/2006 |
| WO | WO-2006109158 A1 | 10/2006 |
| WO | WO-2007046722 A1 | 4/2007 |
| WO | WO-2007051827 A1 | 5/2007 |
| WO | WO-2008101070 A2 | 8/2008 |
| WO | WO-2008103543 A1 | 8/2008 |
| WO | WO-2011011991 A1 | 2/2011 |
| WO | WO-2012008884 A1 | 1/2012 |
| WO | WO-2012177187 A1 | 12/2012 |
| WO | WO-2013109723 A1 | 7/2013 |
| WO | WO-2013123117 A1 | 8/2013 |
| WO | WO-2014039438 A2 | 3/2014 |
| WO | WO-2014039439 A1 | 3/2014 |

(56) References Cited

FOREIGN PATENT DOCUMENTS

| WO | WO-2014039440 A1 | 3/2014 |
|---|---|---|
| WO | WO-2014039447 A1 | 3/2014 |
| WO | WO-2014039448 A2 | 3/2014 |
| WO | WO-2014039708 A1 | 3/2014 |
| WO | WO-2014039713 A1 | 3/2014 |
| WO | WO-2014039846 A2 | 3/2014 |
| WO | WO-2014039900 A1 | 3/2014 |
| WO | WO-2014039901 A1 | 3/2014 |
| WO | WO-2014078583 A1 | 5/2014 |
| WO | WO-2014124291 A1 | 8/2014 |
| WO | WO-2014151889 A2 | 9/2014 |
| WO | WO-2014159755 A2 | 10/2014 |
| WO | WO-2014159756 A2 | 10/2014 |
| WO | WO-2014165259 A1 | 10/2014 |
| WO | WO-2014179717 A1 | 11/2014 |
| WO | WO-2014179719 A1 | 11/2014 |
| WO | WO-2014186732 A1 | 11/2014 |
| WO | WO-2014197711 A1 | 12/2014 |
| WO | WO-2015059601 A1 | 4/2015 |
| WO | WO-2015073883 A1 | 5/2015 |
| WO | WO-2015073887 A1 | 5/2015 |
| WO | WO-2015073948 A2 | 5/2015 |
| WO | WO-2015195759 A2 | 12/2015 |
| WO | WO-2015200769 A1 | 12/2015 |
| WO | WO-2016094254 A1 | 6/2016 |

OTHER PUBLICATIONS

Co-pending U.S. Appl. No. 15/215,179, filed Jul. 20, 2016.
PCT/US2016/29853 International Search Report and Written Opinion dated Aug. 8, 2016.
U.S. Appl. No. 14/334,538 Office Action dated Jul. 29, 2016.
PCT/US2014/065792 International Preliminary Report on Patentability dated Jun. 2, 2016.
PCT/US2014/065909 Written Opinion dated Jun. 6, 2016.
PCT/US2016/027496 International Search Report and Written Opinion dated Jul. 8, 2016.
U.S. Appl. No. 14/425,598 Office Action dated Jun. 14, 2016.
U.S. Appl. No. 14/425,842 Office Action dated Jul. 1, 2016.
U.S. Appl. No. 15/067,752 Office Action dated Jun. 30, 2016.
Co-pending U.S. Appl. No. 14/542,336, filed Nov. 14, 2014.
Co-pending U.S. Appl. No. 14/546,603, filed Nov. 18, 2014.
Co-pending U.S. Appl. No. 14/622,038, filed Feb. 13, 2015.
Fallbrook Technologies. 'NuVinci® Technology', Feb. 26, 2013; [retrieved on Jun. 5, 2014]. Retrieved from internet: <URL: https://web.archive.org/web/20130226233109/http://www.fallbrooktech.com/nuvinci-technology.
Moore et al. A Three Revolute Cobot Using CVTs in Parallel, Proceedings of IMECE, 1999, 6 pgs.
PCT/US2013/021890 International Search Report dated Apr. 10, 2013.
PCT/US2013/026037 International Preliminary Report on Patentability dated Aug. 28, 2014.
PCT/US2013/026037 International Search Report dated Jul. 15, 2013.
PCT/US2013/057837 International Search Report and Written Opinion dated Mar. 31, 2014.
PCT/US2013/057838 International Preliminary Report on Patentability dated Mar. 19, 2015.
PCT/US2013/057866 International Search Report dated Feb. 11, 2014.
PCT/US2013/057868 International Preliminary Report on Patentability dated Mar. 19, 2015.
PCT/US2013/058309 International Preliminary Report on Patentability dated Mar. 19, 2015.
PCT/US2013/058309 International Search Report and Written Opinion dated Feb. 11, 2014.
PCT/US2013/058318 International Preliminary Report on Patentability dated Mar. 19, 2015.
PCT/US2013/058318 International Search Report and Written Opinion dated Feb. 11, 2014.
PCT/US2013/058545 International Preliminary Report on Patentability dated Mar. 19, 2015.
PCT/US2013/058545 International Search Report and Written Opinion dated Feb. 19, 2014.
PCT/US2013/058615 International Preliminary Report on Patentability dated Mar. 19, 2015.
PCT/US2013/058616 International Preliminary Report on Patentability dated Mar. 19, 2015.
PCT/US2013/058616 International Search Report and Written Opinion dated Feb. 11, 2014.
PCT/US2013/070177 International Search Report and Written Opinion dated Apr. 14, 2014.
PCT/US2013/57838 International Search Report and Written Opinion dated Jan. 17, 2014.
PCT/US2013/57839 International Search Report and Written Opinion dated Feb. 6, 2014.
PCT/US2013/57868 International Search Report and Written Opinion dated Apr. 9, 2014.
PCT/US2013/58615 International Search Report and Written Opinion dated Feb. 11, 2014.
PCT/US2014/036621 International Search Report and Written Opinion dated Sep. 4, 2014.
PCT/US2014/036623 International Search Report and Written Opinion dated Sep. 4, 2014.
PCT/US2014/038439 International Search Report and Written Opinion dated Sep. 30, 2014.
PCT/US2014/041124 International Search Report and Written Opinion dated Oct. 15, 2014.
PCT/US2014/065909 International Search Report and Written Opinion dated Feb. 19, 2015.
PCT/US2014/25001 International Search Report and Written Opinion dated Jul. 14, 2014.
PCT/US2014/25004 International Search Report and Written Opinion dated Jul. 14, 2014.
PCT/US2014/25005 International Search Report and Written Opinion dated Jul. 14, 2014.
PCT/US2014/26619 International Search Report and Written Opinion dated Sep. 9, 2014.
PCT/US2014/65792 International Search Report and Written Opinion dated Apr. 9, 2015.
PCT/US2014/65796 International Search Report and Written Opinion dated Apr. 9, 2015.
U.S. Appl. No. 13/743,951 Office Action dated Mar. 18, 2015.
U.S. Appl. No. 61/819,414, filed May 3, 2013.
U.S. Appl. No. 14/017,054 Office Action dated Aug. 27, 2014.
U.S. Appl. No. 14/017,054 Office Action dated Dec. 12, 2014.
Wong. The Temple of VTEC Asia Special Focus on the Multimatic Transmission. Temple of VTEC Asia. 2000.
U.S. Appl. No. 15/067,427, filed Mar. 11, 2016.
U.S. Appl. No. 15/067,752, filed Mar. 11, 2016.
U.S. Appl. No. 14/210,130 Office Action dated Jun. 7, 2016.
U.S. Appl. No. 14/378,750 Office Action dated Apr. 8, 2016.
U.S. Appl. No. 14/425,600 Office Action dated May 16, 2016.
PCT/US2013/021890 International Preliminary Report on Patentability dated Jul. 31, 2014.
PCT/US2013/057837 International Preliminary Report on Patentability dated Mar. 19, 2015.
PCT/US2013/057839 International Preliminary Report on Patentability dated Mar. 19, 2015.
PCT/US2013/057866 International Preliminary Report on Patentability dated Mar. 19, 2015.
PCT/US2013/070177 International Preliminary Report on Patentability dated May 28, 2015.
PCT/US2014/015352 International Search Report and Written Opinion dated May 27, 2014.
U.S. Appl. No. 13/743,951 Office Action dated Aug. 19, 2015.
U.S. Appl. No. 14/175,584 Office Action dated Apr. 2, 2015.
U.S. Appl. No. 60/616,399, filed Oct. 5, 2004.
PCT/US2014/041124 International Preliminary Report on Patentability dated Dec. 17, 2015.

(56) References Cited

OTHER PUBLICATIONS

PCT/US2015/36170 International Search Report and Written Opinion dated Dec. 17, 2015.
PCT/US2015/64087 International Search Report and Written Opinion dated Feb. 11, 2016.
U.S. Appl. No. 13/743,951 Office Action dated Jan. 21, 2016.
Co-pending U.S. Appl. No. 15/260,472, filed Sep. 9, 2016.
Co-pending U.S. Appl. No. 15/265,163, filed Sep. 14, 2016.
Co-pending U.S. Appl. No. 15/265,226, filed Sep. 14, 2016.
Co-pending U.S. Appl. No. 15/272,774, filed Sep. 22, 2016.
Co-pending U.S. Appl. No. 15/284,940, filed Oct. 4, 2016.
PCT/US2016/030930 International Search Report and Written Opinion dated Sep. 23, 2016.
PCT/US2016/038064 International Search Report and Written Opinion dated Sep. 7, 2016.
U.S. Appl. No. 14/425,600 Office Action dated Sep. 23, 2016.
U.S. Appl. No. 62/158,847, filed May 8, 2015.
Co-pending U.S. Appl. No. 14/925,813, filed Oct. 28, 2015.
PCT/US2014/025001 International Preliminary Report on Patent ability dated Sep. 24, 2015.
PCT/US2014/025004 International Preliminary Report on Patentability dated Oct. 1, 2015.
PCT/US2014/025005 International Preliminary Report on Patentability dated Oct. 1, 2015.
PCT/US2014/026619 International Preliminary Report on Patentability dated Sep. 24, 2015.
PCT/US2014/036621 International Preliminary Report on Patentability dated Nov. 12, 2015.
PCT/US2014/036623 International Preliminary Report on Patentability dated Nov. 12, 2015.
PCT/US2014/038439 International Preliminary Report on Patentability dated Nov. 26, 2015.
PCT/US2014/065796 International Preliminary Report on Patentability dated Nov. 6, 2015.
PCT/US2014/065909 Written Opinion dated Dec. 11, 2015.
PCT/US2015/37916 International Search Report and Written Opinion dated Sep. 29, 2015.
U.S. Appl. No. 14/175,584 Office Action dated Dec. 3, 2015.
U.S. Appl. No. 14/210,130 Office Action dated Nov. 20, 2015.
U.S. Appl. No. 14/426,139 Office Action dated Oct. 6, 2015.
U.S. Appl. No. 14/542,336 Office Action dated Nov. 25, 2015.
PCT/US2016/045857 International Search Report and Written Opinion dated Oct. 13, 2016.

\* cited by examiner

IVT BASED ON A BALL-TYPE CVP INCLUDING POWERSPLIT PATHS

CROSS-REFERENCE

This application is filed pursuant to 35 U.S.C. 371 as a United States National Phase Application of International Application No. PCT/US2013/058318, filed Sep. 5, 2013, which application claims the benefit of U.S. Provisional Application No. 61/697,960, filed Sep. 7, 2012 and U.S. Provisional Application No. 61/784,255, filed Mar. 14, 2013, which are incorporated herein by reference in their entirety.

BACKGROUND OF THE INVENTION

Automatic and manual transmissions are commonly used on automobile vehicles. Those transmissions are becoming more and more complicated since the engine speed has to be more precisely controlled to limit the fuel consumption and the emissions of cars. This finer control of the engine speed in usual transmissions can only be done by adding more discrete step ratio gears and increasing the overall complexity and cost. Consequently, 6-speed manual transmissions then become more frequently used as are 8 or 9 speed automatic transmissions.

SUMMARY OF THE INVENTION

Provided herein is a variable transmission comprising: an input shaft; two planetary gear sets, a first planetary set on the input side of a variator, and a second planetary set on the output side of the variator, to split the torque; a variator comprising, a first ring assembly, a second ring assembly; various arrangements of brakes and clutches; a gearbox; and the output shaft.

In some embodiments, the variable transmission comprises a continuously variable mode, an infinitely variable mode or a combination thereof.

In some embodiments the variable transmission can provide a reverse function, a standstill function and a low speed function.

In some embodiments, the transition between continuously variable transmission mode and infinitely variable transmission mode is accomplished by releasing the clutch and engaging the brake, or alternatively engaging the clutch and releasing the brake.

In some embodiments, the variator is able to continuously change its ratios in both the continuously variable mode and infinitely variable mode to provide the best ratio achievable for the engine to optimize power consumption.

Provided herein is a variable transmission comprising: an input shaft; a first planetary gear set comprising a sun gear drivingly engaged to the input shaft; a clutch member coupled to the input shaft for engaging the carrier of the first planetary gear set; a brake member coupled to the carrier of the first planetary gear set; the ring of the input planetary gear set drivingly engaged to a first ring assembly of a variator; said variator comprising a first ring assembly, and a second ring assembly; said second variator ring assembly drivingly engaged to the ring of a second planetary gear set; wherein the second sun of the second planetary gear set is also drivingly engaged to the input shaft; and the carrier of said second planetary gear set is drivingly engaged to a gearbox; and said gearbox is mechanically connected to a differential.

In some embodiments, the power will pass through the variator while part of the power will pass directly from one planetary gear set to the other planetary gear set through a mechanical path with higher efficiency.

In some embodiments, when the clutch is engaged and the brake is disengaged the carrier of the input planetary is held fixed to the input shaft, the whole planetary gear set turning then with the input shaft, thereby engaging a continuously variable mode.

In some embodiments, the power passes directly through the entire first planetary gear set to the first ring assembly of the variator, combining with the output from the input shaft on the second sun of the second planetary gear set and the second ring assembly of the variator when the transmission is in continuously variable mode.

In some embodiments, the clutch is disengaged and the brake is engaged, the carrier of the first planetary gear is held while the first and second sun gears are still turning at the speed of the input shaft, thereby engaging an infinitely variable mode.

In some embodiments, the ring of the input planetary gear set carrier will turn in the reverse direction of the input shaft and in underdrive.

In some embodiments, the power output going to the gearbox can go from reverse speeds to positive speeds through standstill thereby providing an infinitely variable mode.

In some embodiments, when in the infinitely variable mode, the variator provides a reverse function, a standstill function and a low speed function.

In some embodiments, when in the infinitely variable mode, the first planetary provides a reverse function, a standstill function and a low speed function.

In some embodiments, when in the continuously variable mode, the ring of the planetary gear set has a positive rotation speed.

In some embodiments, when in the infinitely variable mode, the ring of the planetary gear set has a negative rotation speed.

In some embodiments, the transition between continuously variable mode and infinitely variable mode is accomplished by simultaneously closing the brake while releasing the clutch.

In some embodiments, the variator continuously changes its torque ratios in both the continuously variable mode and infinitely variable mode to optimize power consumption.

In some embodiments, the only interruptions of power are to change from continuous to infinitely mode and to change the gear ratio in the gearbox.

In some embodiments, a dry-clutch is not required between the input shaft and the variable transmission.

In some embodiments, a torque converter is not required between the input shaft and the variable transmission Provided herein is a variable transmission comprising: an input shaft; a first planetary gear set comprising an input ring drivingly engaged to the input shaft; a carrier from a first planetary gear set mechanically connected through a clutch to the first ring assembly of a variator and the first sun of the first planetary gear set; said variator comprising a first ring assembly, and a second ring assembly; a brake member coupled to the carrier of the first planetary gear set; the second ring assembly of the variator drivingly connected to the second sun of a second planetary gear set; a countershaft drivingly connecting the rings of the first and second planetary gear sets, wherein said countershaft transfers power from one ring to the other; the carrier of the second planetary gear set drivingly connected to a gearbox; said gearbox mechanically linked to a differential In some embodiments, the variable transmission comprises a continuously variable mode and an infinitely variable mode.

In some embodiments, the torque will be split between planetary gear sets on either side of the variator In some embodiments, part of the power will pass through the variator while part of the power will pass from one planetary to the other through a mechanical path with higher efficiency.

In some embodiments, the clutch is engaged and the brake is disengaged, connecting the carrier and the first sun of the first planetary gear set, thereby engaging a continuously variable mode.

In some embodiments, the entire first planetary gear set is turning at the same speed as the input shaft and speed of the input shaft is directly applied to the first input ring assembly of the variator.

In some embodiments, the second planetary gear set combines the power from the input shaft on the ring with the output from the variator on the second sun of the second planetary set.

In some embodiments, the clutch is disengaged and the brake is engaged, holding the carrier of the first planetary gear set, thereby engaging an infinitely variable mode.

In some embodiments, the rings of the first and second planetary gear sets turn at engine speed, the first sun of the first planetary gear set will turn in reverse direction to the input shaft and in overdrive.

In some embodiments, the second planetary gear set in continuously variable mode whereby the power from the input shaft and output of the variator are combined, and the rotation of the second sun of the second planetary gear set is reversed.

In some embodiments, the output from the second planetary gear set going to the gear box provides reverse speeds to positive speeds through a standstill, thereby providing an infinitely variable mode.

In some embodiments, the first and second sun gears turn in a positive rotation when in a continuously variable mode.

In some embodiments, the first and second sun gears turn in a negative rotation when in an infinitely variable mode.

In some embodiments, a transition between continuously variable mode and infinitely variable mode is accomplished by simultaneously closing the brake while releasing the clutch.

In some embodiments, the vehicle output comprises a wheel differential and one or more wheels of a vehicle.

In some embodiments, the vehicle output comprises a wheel differential and a drive axle.

In some embodiments, the dampener is disposed between the engine and the variable transmission.

In some embodiments, the dampener comprises at least one torsional spring.

Provided herein is a method comprising providing a variable transmission of any of configuration described herein or obvious to one of skill in the art upon reading the disclosure herein. In some embodiments, the variable transmission comprises a traction fluid in the variator.

Provided herein is a method comprising, providing a vehicle driveline of any of configuration described herein or obvious to one of skill in the art upon reading the disclosure herein.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Continuously Variable Transmissions or CVTs are of many types: belts with variable pulleys, toroidal, and conical, for non-limiting example. The principle of a CVT is that it enables the engine to run at its most efficient rotation speed by changing steplessly the transmission ratio in function of the speed of the car and the torque demand (throttle position) of the driver. If needed for example when accelerating, the CVT can also shift to the most optimum ratio providing more power. A CVT can change the ratio from the minimum to the maximum ratio without any interruption of the power transmission, as opposed to the opposite of usual transmissions which require an interruption of the power transmission by disengaging to shift from one discrete ratio to engage the next ratio.

A specific use of CVTs is the Infinite Variable Transmission or IVT. Where the CVT is limited at positive speed ratios, the IVT configuration can perform a neutral gear and even reverse steplessly. A CVT can be used as an IVT in some driveline configurations.

Provided herein are configurations based on a ball type CVT, also known as CVP (for constant variable planetary) or a variator, herein. Aspects of an example CVT are described in US2006084549 or AU2011224083A1, incorporated herein by reference in their entirety. The type of CVT used herein is comprised a variator comprising a plurality of variator balls 997 (for example, 3-15 balls), depending on the application, two discs 995, 996 or annular rings (i.e. a first ring assembly and a second ring assembly) each having an engagement portion that engages the variator balls, as input and output respectively. The engagement portions may be in a conical or toroidal convex or concave surface contact with the variator balls, as input and output.

Figure 1:
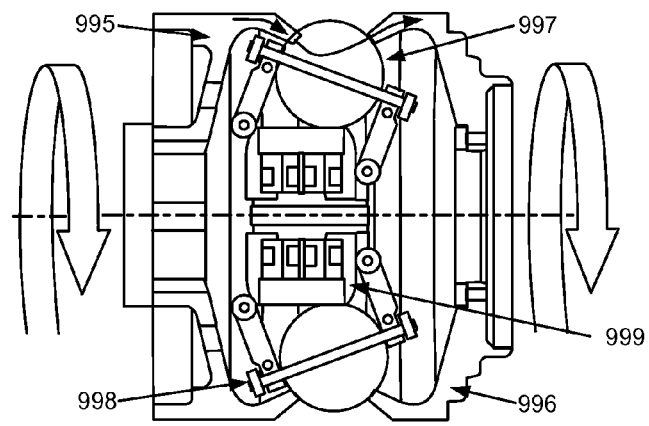
FIG. 1 is a side sectional view of a continuously variable planetary (CVP) transmission.
Figure 2:
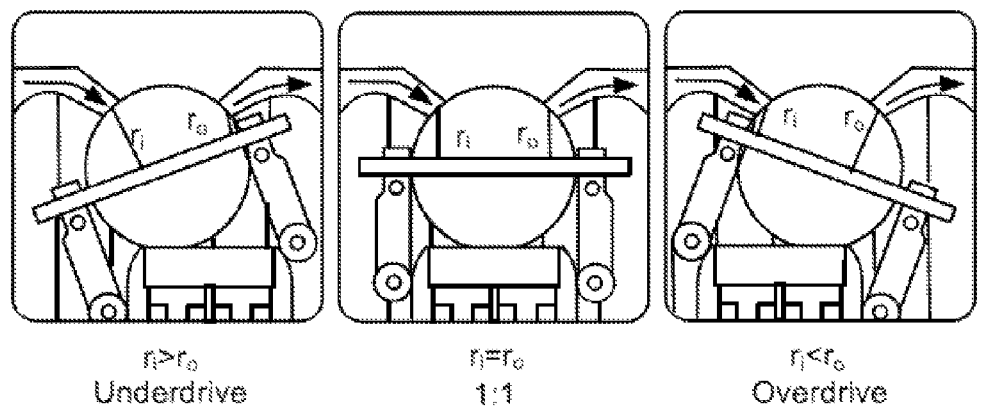
FIG. 2 is a magnified, side sectional view of a ball and ring of the CVP transmission of FIG. 1.

The variator may include an idler 999 contacting the balls as well as shown on FIG. 1. The variator balls are mounted on axes 998, themselves held in a cage or carrier allowing changing the ratio by tilting the variator balls' axes. Other types of ball CVTs also exist, like the one produced by Milner but are slightly different. These alternative ball CVTs are additionally contemplated herein. The working principle generally speaking, of a ball-type variator of a CVT is shown in FIG. 2.

The variator itself works with a traction fluid. The lubricant between the ball and the conical rings acts as a solid at high pressure, transferring the power from the first ring assembly, through the variator balls, to the second ring assembly. By tilting the variator balls' axes, the ratio can be changed between input and output. When the axis of each of the variator balls is horizontal the ratio is one, when the axis is tilted the distance between the axis and the contact point change, modifying the overall ratio. For example, when the axis is horizontal the ratio is one (1:1), when the axis is tilted the distance between the axis and the contact point change, modifying the overall ratio (input radius>output radius=underdrive; input radius<output radius=overdrive). All the variator balls' axles are tilted at the same time with a mechanism included in the cage.

Figure 3:
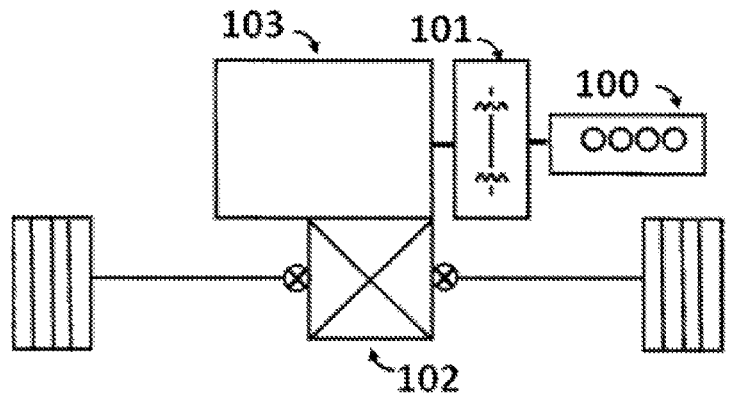
FIG. 3 is a block diagram of a continuously variable transmission (CVT) used in an automobile.

In a car, the CVT 103 includes a CVP (continuously variable planetary) 7 and is used to replace traditional transmission and is located between the engine 100 and the differential 102 as shown on FIG. 3. A torsional damper 101 has to be introduced between the engine and the CVT 103 to avoid transferring torque peaks and vibrations that could seriously damage the CVT 103. In some configurations, this damper 101 can be coupled with a clutch for the starting function.

Figure 4:
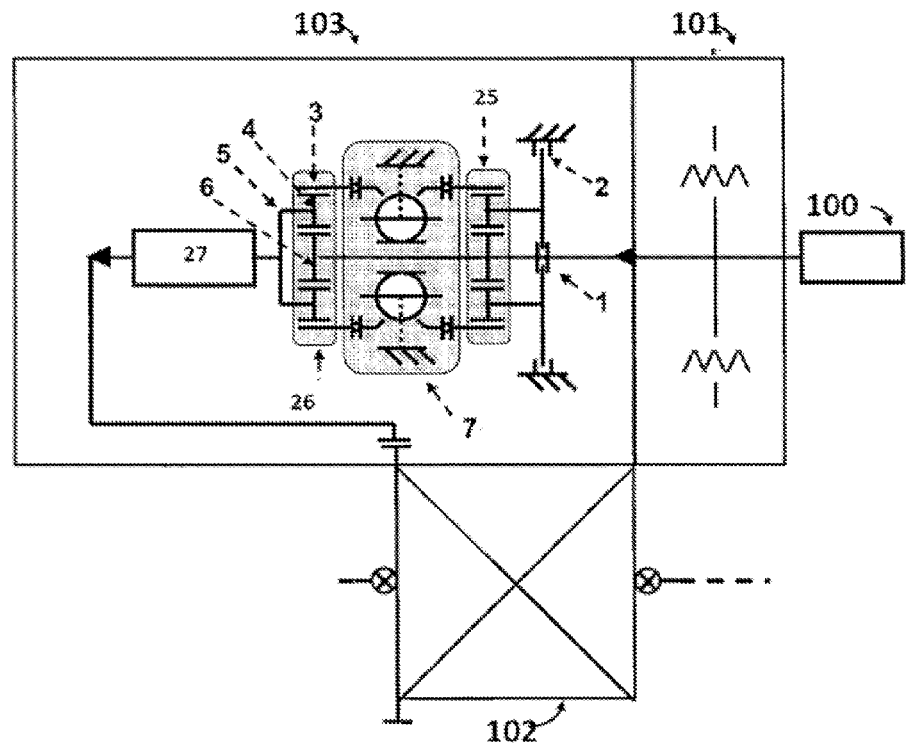
FIG. 4 is a block diagram of a continuously variable transmission (CVT) according to an embodiment of the present disclosure used in an automobile having both a continuously variable mode and an infinitely variable mode.
Figure 6:
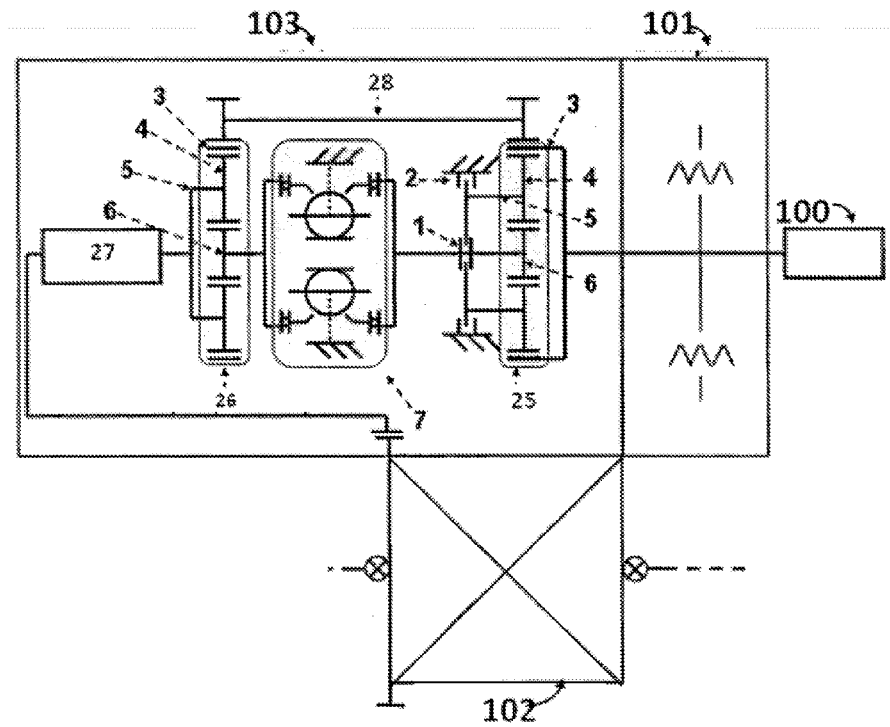
FIG. 6 is a block diagram of a continuously variable transmission (CVT) according to another embodiment of the present disclosure used in an automobile having both a continuously variable mode and an infinitely variable mode.

Embodiment variable transmissions (and resulting drivelines) 103 are shown in FIGS. 4 and 6. The central part of these configurations is a variator 7 (also called a CVP herein). Such variator 7 comprises a first ring assembly, a second ring assembly, and a carrier assembly disposed therebetween. The carrier assembly includes a plurality of variator balls having tiltable axle shafts as described herein. In some embodiments, the first ring assembly is rotatably disposed in a housing; the first ring assembly comprises a first variator ball engagement surface that is in driving engagement with a plurality of variator balls of the carrier assembly. The first ring assembly (shown on the right side of the variator embodiments of FIG. 4 and FIG. 6) may be drivingly engaged with a ring of an input planetary gearset 25.

A first variator ball engagement surface is formed in a distal end of the first ring assembly. In some embodiments, the first variator ball engagement surface is a conical surface or a concave or convex toroidal surface in contact with or slightly spaced apart from each of the variator balls. In some embodiments, the first variator ball engagement surface is in driving engagement with each of the variator balls of the carrier assembly through one of a boundary layer type friction and an elastohydrodynamic film.

The carrier assembly of the variator of FIGS. 4 and 6 may be rotatably disposed in the housing. The carrier assembly comprises an annular arrangement of the plurality of tiltable variator balls each having tiltable ball axle shafts. In some embodiments, each of the ball axle shafts is adjusted using a cam style tilting mechanism. In some embodiments, each of the ball axle shafts is adjusted using a split carrier axle skewing mechanism.

As depicted in FIGS. 4 and 6, at least, a second ring assembly is rotatably disposed in the housing. The second ring assembly comprises a second variator ball engagement surface that is in driving engagement with variator balls of the carrier assembly. In some embodiments, the second variator ball engagement surface is formed in a distal end of the second ring assembly. In some embodiments, the second variator ball engagement surface is a conical surface or a concave or convex toroidal surface in contact with or slightly spaced apart from each of the variator balls. In some embodiments, the second variator ball engagement surface is in driving engagement with each of the variator balls of the carrier assembly through one of a boundary layer type friction and an elastohydrodynamic film.

A ball ramp on each side of the variator provides the clamping force necessary to transfer the torque. Ball ramps, indicated in FIGS. 4 and 6 by a circle between a pair of vertical lines, making up a first thrust ring on the first ring assembly and a second thrust ring on the second ring assembly are disposed between components of the variable transmission as shown to generate an amount of axial force necessary for proper operation of the variable transmission (i.e. transfer of torque); however, it is understood that the amount of axial force necessary for proper operation may be generated by a clamping mechanism (not shown) or as a load applied during assembling of the variable transmission. Thus, as depicted in FIGS. 4 and 6, a ball ramp on each side of the variator provides the clamping force necessary to transfer the torque in this embodiment.

Provided herein is a variable transmission comprising: an input shaft; two planetary gear sets, a first planetary gear set 25 on the input side of a variator (i.e. the side comprising the first ring assembly), and a second planetary gear set 26 on the output side of the variator (i.e. the side comprising the second ring assembly) to split the torque; the variator of such variable transmission comprises a first ring assembly, a second ring assembly. The first planetary gear set 25 may alternatively be called the input planetary, or input planetary gear set herein. The second planetary gear set 26 may alternatively be called the output planetary, or output planetary gear set herein. The variable transmission may additionally comprise various arrangements of brakes and clutches; a gearbox 27; and an output shaft.

In some embodiments, the variable transmission comprises a continuously variable mode and an infinitely variable mode. In some embodiments the variable transmission can provide a reverse function, a standstill function and a low speed function.

In some embodiments, the transition between continuously variable transmission mode and infinitely variable transmission mode is accomplished by releasing a clutch and engaging a brake, or alternatively engaging the clutch and releasing the brake.

In some embodiments, the variator is able to continuously change its ratios in both the continuously variable mode and infinitely variable mode to provide the best ratio achievable for the engine to optimize power consumption.

Provided herein is a variable transmission comprising: an input shaft; a first planetary gear set comprising a sun gear drivingly engaged to the input shaft; a clutch member coupled to the input shaft for engaging the carrier of the first planetary gear set; a brake member coupled to the carrier of the first planetary gear set 25; the ring of the input planetary gear set drivingly engaged to a first ring assembly of a variator; said variator comprising a first ring assembly, and a second ring assembly; said second variator ring assembly drivingly engaged to the ring of a second planetary gear set 26; wherein the sun of said second planetary gear set 26 is also drivingly engaged to the input shaft; and the carrier of said second planetary gear set 26 is drivingly engaged to a gearbox 27; and said gearbox 27 is mechanically connected to a differential.

In some embodiments, the power will pass through the variator while part of the power will pass directly from the first planetary gear set 25 to the second planetary gear set 26 through a mechanical path with higher efficiency.

In some embodiments, when the clutch is engaged and the brake is disengaged the carrier of the first planetary gear set is held fixed together with the input shaft, the whole planetary turning then at the input shaft speed, thereby engaging a continuously variable mode.

In some embodiments, the power passes directly through the entire first planetary gear set to the first ring assembly of the variator, combining with the output from the input shaft on the second sun of the second planetary gear set and the second ring assembly of the variator when the transmission is in continuously variable mode.

In some embodiments, the clutch is disengaged and the brake is engaged, the carrier of the first planetary gear set is held while the first and second sun gears are still turning at the speed of the input shaft, thereby engaging an infinitely variable mode.

In some embodiments, the ring of the first planetary gear set will turn in the reverse direction of the input shaft and in underdrive.

In some embodiments, the power output going to the gearbox can go from reverse speeds to positive speeds through standstill thereby providing an infinitely variable mode.

In some embodiments, when in the infinitely variable mode, the variator provides a reverse function, a standstill function and a low speed function.

In some embodiments, when in the infinitely variable mode, the first planetary gear set provides a reverse function, a standstill function and a low speed function.

In some embodiments, when in the continuously variable mode, the ring of the first planetary gear set has a positive rotation speed.

In some embodiments, when in the infinitely variable mode, the ring of the first planetary gear set has a negative rotation speed.

In some embodiments, the transition between continuously variable mode and infinitely variable mode is accomplished by simultaneously closing the brake while releasing the clutch.

In some embodiments, the variator continuously changes its torque ratios in both the continuously variable mode and infinitely variable mode to optimize power consumption.

In some embodiments, the only interruptions of power are to change from continuous to infinitely mode and to change the gear ratio in the gearbox.

In some embodiments, a dry-clutch is not required between the input shaft and the variable transmission.

In some embodiments, a torque converter is not required between the input shaft and the variable transmission Provided herein is a variable transmission comprising: an input shaft; a first planetary gear set 25 comprising an input ring drivingly engaged to the input shaft; a carrier from a first planetary gear set mechanically connected through a clutch to the first ring assembly of a variator and a first sun of the first planetary gear set; said variator comprising a first ring assembly, and a second ring assembly; a brake member coupled to the carrier of the first planetary gear set; the second ring assembly of the variator drivingly connected to a second sun of a second planetary gear set 26; a countershaft 28 drivingly connecting the rings of the first and second planetary gear sets 25, 26, wherein said countershaft 28 transfers power from one ring to the other; the carrier of the second planetary gear set 26 drivingly connected to a gearbox 27; said gearbox 27 mechanically linked to a differential 102.

In some embodiments, the variable transmission comprises a continuously variable mode and an infinitely variable mode.

In some embodiments, the torque will be split between the first planetary gear set on one side of the variator, and the second planetary gear set on an opposing side of the variator.

In some embodiments, part of the power will pass through the variator while part of the power will pass from a first planetary gear set to the second planetary gear set through a mechanical path with higher efficiency.

In some embodiments, the clutch is engaged and the brake is disengaged, connecting the carrier and the first sun of the first planetary gear set, thereby engaging a continuously variable mode.

In some embodiments, the entire first planetary gear set is turning at the same speed as the input shaft and speed of the input shaft is directly applied to the first input ring assembly of the variator.

In some embodiments, the second planetary gear set combines the power from the input shaft and the ring with the output from the variator on the second sun of the second planetary gear set.

In some embodiments, the clutch is disengaged and the brake is engaged, holding the carrier of the first planetary gear set, thereby engaging an infinitely variable mode.

In some embodiments, the first ring of the first planetary gear set and the second ring of the second planetary gear set turn at engine speed, the first sun of the first planetary gear set will turn in reverse direction to the input shaft and in overdrive.

In some embodiments, the second planetary gear set in continuously variable mode whereby the power from the input shaft and output of the variator are combined, and the rotation of the second sun of the second planetary gear set is reversed.

In some embodiments, the output from the second planetary gear set going to the gear box provides reverse speeds to positive speeds through a standstill, thereby providing an infinitely variable mode.

In some embodiments, first and second sun gears turn in a positive rotation when in a continuously variable mode.

In some embodiments, the first and second sun gears turn in a negative rotation when in an infinitely variable mode.

In some embodiments, a transition between continuously variable mode and infinitely variable mode is accomplished by simultaneously closing the brake while releasing the clutch.

In some embodiments, the vehicle output comprises a wheel differential and one or more wheels of a vehicle.

In some embodiments, the vehicle output comprises a wheel differential and a drive axle.

In some embodiments, the dampener is disposed between the engine and the variable transmission.

In some embodiments, the dampener comprises at least one torsional spring.

Provided herein is method comprising, providing a variable transmission of any of configuration described herein or obvious to one of skill in the art upon reading the disclosure herein. In some embodiments, the variable transmission comprises a traction fluid in the variator.

Provided herein is a method comprising, providing a vehicle driveline of any of configuration described herein or obvious to one of skill in the art upon reading the disclosure herein.

Example 1

The embodiment of FIG. 4 comprises two planetary gear sets, one on each side of the variator to split the torque. This configuration includes a continuously variable mode as well as an infinitely variable mode providing a standstill, reverse, and starting function. No starting device such as a slipping clutch or torque converter is required, since the infinitely variable mode takes care of the starting function. But such a device might be added for other reasons.

In this configuration, a part of the power will pass through the variator while a part of it will pass directly from one planetary to the other through a mechanical path with higher efficiency.

This power splitting allows to have a relatively small variator, and thus relatively small variable transmission and to increase the native efficiency of the transmission. The central part of that configuration is the variator described previously in the document. A ball ramp on each side of the variator provides the clamping force necessary to transfer the torque.

This configuration results in a continuously variable mode and an infinitely variable mode of operation. The selection between those modes is made by engaging a clutch 1 or a brake 2. In addition, a gearbox 27 is added after the variator to increase the spread of the variator and avoid any gap between the modes.

The internal combustion engine (ICE) 100 is connected to the two suns of both planetary gear sets 25, 26. The carrier of the input planetary 25 can either be held fixed by a brake 2, or can be connected to the sun by engaging a clutch 1. The first ring assembly of the variator is linked to the ring of the input planetary and the second ring assembly of the variator is then linked to the ring of the second planetary gear set. The carrier of the second planetary gear set is directly linked to a three speed gearbox of which the output is connected to the differential.

This device works in continuously variable mode when the clutch 1 is engaged and the brake 2 disengaged. By connecting the carrier and the sun of the input planetary 25 with each other, the whole planetary 25 turns at the same speed and the speed from the ICE 100 is directly applied to the input of the CVP 7. The output planetary 26 is combining the input from the ICE 100 on the sun 6 and the output from the CVP 7 on the ring 3.

The Infinitely variable mode is activated by disengaging the clutch 1 and engaging the brake 2. Thus, the carrier is held while the two suns are still turning at the ICE speed. By holding the carrier, the ring of the input planetary 25 will turn in the reverse direction compared to the ICE 100 and in underdrive. The second planetary 26 has the same function as in the continuously variable mode, combining the inputs from the ICE 100 and the output of the CVP 7. The only difference is that the input on the ring is now in a reverse direction. By doing this, the output going to the additional gearbox 27 can go from reverse speeds to positive speeds through standstill and therefore provides an IVP function.

Figure 5:
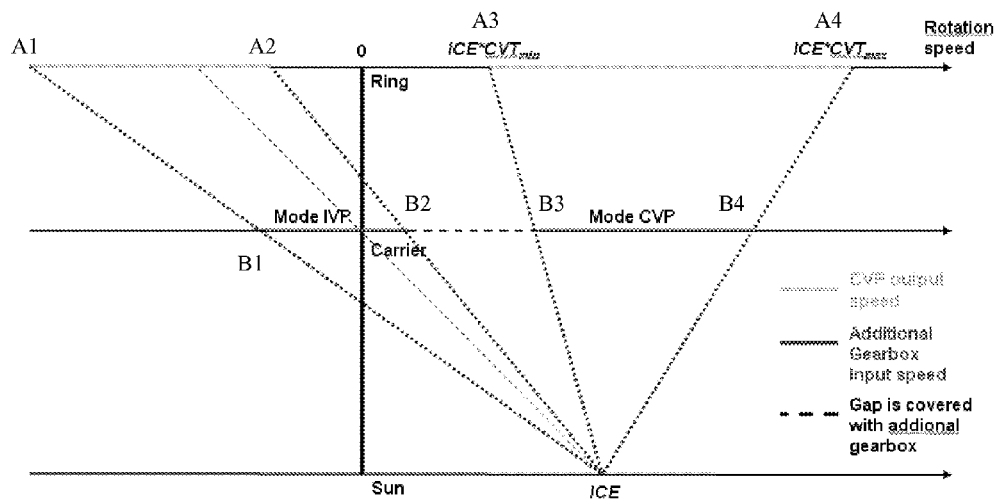
FIG. 5 is a graph of a speed diagram of the output planetary gear set of the CVT of FIG. 4.

As shown in FIG. 5, the three horizontal axes represent respectively, from the bottom to the top, the sun rotation speed, the carrier rotation speed and the ring rotation speed of the second planetary gear set. The carrier is the output and is linked to the three speed gearbox. The sun is always turning at ICE speed while the ring speed (IVP mode: A1-A2; CVP mode: A3-A4) changes from mode to mode. In the continuously variable mode, the ring has a positive rotation speed (A3-A3) while in infinitely variable mode, it has a negative rotation speed (A1-A2). The output speed on the carrier of the two modes is shown by the B1-B2 in IVP mode, and B3-B4 in CVP mode. The gap between B2 and B3, represented by a dotted line on the carrier axis, is covered with the additional gearbox.

The transition between the two modes is done by releasing one clutch and closing the brake. This device is able to change continuously its ratio to provide the best ratio achievable for the engine in function of the objectives of consumption or power. In a manual or automatic transmission, only some predetermined and discrete ratios are available and an interruption of the power transmission is needed to shift of ratio. The only interruptions of power in this device are to change from the CVT mode (CVP mode) to the IVT mode (IVP mode) and to change the gear ratio in the gearbox. Other advantages of this configuration are that no dry-clutch or torque converter is needed between the internal combustion engine and the transmission; a very small variator can be chosen; spread is very large and the native efficiency of the transmission is increased by using the variator in a powersplit device, thereby letting part of the power pass through a more efficient mechanical path.

Example 2

An alternative configuration shown in FIG. 6 uses one planetary gearset on each side of the variator to split the torque. A part of the power will pass through the variator while the other part of it will pass directly from one planetary to the other through a mechanical path with higher efficiency. This power splitting allows to have a relatively small CVP 7 and to increase the native efficiency of the transmission. The central part of that configuration is the variator described previously in the document. A ball ramp on each side of the variator provides the clamping force necessary to transfer the torque.

This configuration uses two modes performing continuously variable or infinitely variable mode. The selection between those two modes is made by engaging a clutch 1 or a brake 2. In addition, a gearbox 27 is added after the variator 7 to increase the spread of the variator 7 and avoid any gap between the modes.

The ICE 100 is linked to the ring of the input planetary 25. The carrier of the input planetary can either be held fixed by a brake 2 or can be connected to the sun by engaging a clutch 1. The first ring assembly of the variator 7 is linked to the sun of the input planetary 25 and the second ring assembly of the variator is then linked to the second sun of the second planetary gear set 26. The carrier of the second planetary gear set is directly linked to a gearbox 27 of which the output is connected to the differential 102. For practical reasons, a countershaft 28 connects the rings from the two planetary gear sets 25, 26 transferring power from one to another.

This device works in continuously variable mode when the clutch 1 is engaged and the brake 2 disengaged. By connecting the carrier 5 and the sun 6 of the input planetary 25 with each other, the whole input planetary 25 turns at the same speed and the speed from the ICE 100 is directly applied to the first ring assembly of the variator 7. The output planetary 26 is combining the input from the ICE 100 on the ring 3 and the second ring assembly from the variator 7 on the sun 6.

The Infinitely variable mode is activated by disengaging the clutch 1 and engaging the brake 2. Thus, the carrier 5 of the first planetary gear set 25 is held while the two rings turns at the engine speed. By holding the carrier, the sun of the input planetary 25 will turn in the reverse direction compared to the ICE and in overdrive. The second planetary 26 has the same function as in the continuously variable mode, combining the inputs from the ICE 100 and the output of the variator 7. The only difference is that the input on the second sun is now in a reverse direction. By doing this, the output going to the additional gearbox 27 can go from reverse speeds to positive speeds through standstill and therefore provides infinitely variable mode functionality.

Figure 7:
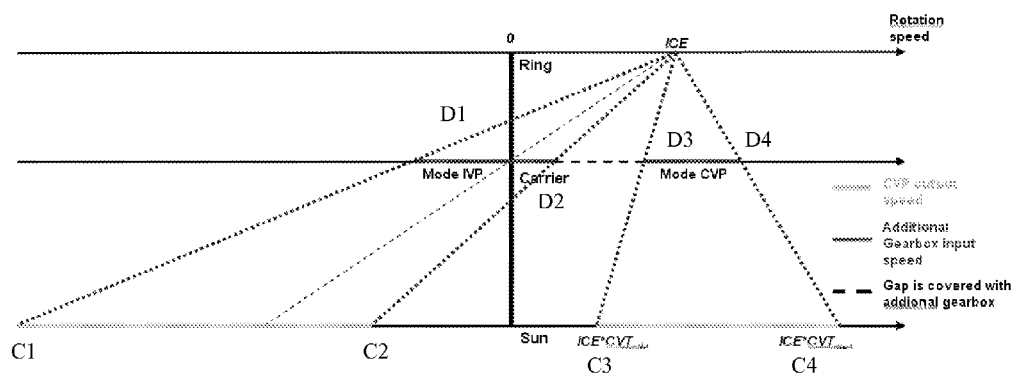
FIG. 7 is a graph of a speed diagram of the output planetary gear set of the CVT of FIG. 6.

FIG. 7 shows the rotation speeds of the second planetary gear set. In FIG. 7, the three horizontal axes represent respectively, from the bottom to the top, the sun rotation speed, the carrier rotation speed and the ring rotation speed of the second planetary gear set. The carrier is the output and is linked to gearbox. The ring is always turning at ICE speed while the sun speed changes from mode to mode (IVP mode: C1-C2; CVP mode: C3-C4). In the continuously variable mode, the sun has a positive rotation speed (C3-C4) while in infinitely variable mode, it has a negative rotation speed (C1-C2). The output speed on the carrier of the two modes is represented on the carrier axis between the first diagonal dotted line and the third diagonal dotted line on the carrier axis which shows the carrier speed in IVP mode from D1-D2, and again between the fourth diagonal dotted line and the fifth diagonal dotted line on the carrier axis which shows the carrier speed in CVP mode from D3-D4. The gap between the two portions is covered with the additional gearbox shown as a dotted line on the carrier speed axis.

The transition between the two modes is done by releasing one clutch and closing the brake. This device is able to change continuously its ratio to provide the best ratio achievable for the engine in function of the objectives of consumption or power. In a manual or automatic transmission, only some predetermined and discrete ratios are available and an interruption of the power transmission is needed to shift of ratio. The only interruptions of power in this device are to change from the CVT mode (CVP mode) to the IVT mode (IVP mode) and to change the gear ratio in the gearbox. Other advantages of this configuration are that no dry-clutch or torque converter is needed between the internal combustion engine and the transmission; a very small variator can be chosen; spread is similar to a traditional gearbox and the native efficiency of the transmission is increased by using the variator in a powersplit device, therefore letting a part of the power passing through a more efficient mechanical path. Native efficiency will be higher than the first variant shown on FIG. 4, because the variator is connected to the sun, where the torque is lower, so more power is transmitted through the mechanical path (the ring and countershaft).

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A variable transmission comprising:
an input shaft;
a first planetary gear set comprising a first sun gear drivingly engaged to the input shaft;
a clutch member coupled to the input shaft for engaging the carrier of the first planetary gear set;
a brake member coupled to a carrier of the first planetary gear set;
a ring gear of the input planetary gear set drivingly engaged to a first ring assembly of a variator;
said variator comprising said first ring assembly, and a second ring assembly;
said second variator ring assembly drivingly engaged to a ring gear of a second planetary gear set;
wherein a second sun gear of said second planetary gear set is also drivingly engaged to the input shaft; and
a carrier of said second planetary gear set is drivingly engaged to a gearbox; and said gearbox is mechanically connected to a differential.

2. The variable transmission of claim 1, comprising a continuously variable mode and an infinitely variable mode.

3. The variable transmission of claim 1 wherein part of the power will pass through the variator while part of the power will pass directly from one planetary gear set to the other planetary gear set through a mechanical path with higher efficiency.

4. The variable transmission of claim 1, wherein when the clutch member is engaged and the brake member is disengaged the carrier of the first planetary gear set is held fixed together with the input shaft, the whole first planetary gear set turning then at an input shaft speed, thereby engaging a continuously variable mode.

5. The variable transmission of claim 4, wherein power passes directly through the entire first planetary gear set to the first ring assembly of the variator, combining the output from the input shaft on the second sun gear of the second planetary gear with the second ring assembly of the variator when the transmission is in the continuously variable mode.

6. The variable transmission of claim 1, wherein the clutch member is disengaged and the brake member is engaged, the carrier of the first planetary gear set is held while the first and second sun gears are still turning at a speed of the input shaft, thereby engaging an infinitely variable mode.

7. The variable transmission of claim 6, wherein the ring gear of the first planetary gear set will turn in the reverse direction of the input shaft and in underdrive.

8. The variable transmission of claim 2, wherein in the infinitely variable mode, the transmission provides a reverse function, a standstill function and a low speed function.

9. The variable transmission of claim 2, wherein in the infinitely variable mode, the first planetary gear set provides a reverse function, a standstill function and a low speed function.

10. The variable transmission of claim 2, wherein in the continuously variable mode, the ring, gear of the first planetary gear set has a positive rotation speed.

11. The variable transmission of claim 2, wherein in the infinitely variable mode, the ring gear of the first planetary gear set has a negative rotation speed.

12. The variable transmission of claim 2, wherein a transition between continuously variable mode and infinitely variable mode is accomplished by simultaneously closing the brake member while releasing the clutch member.

13. The variable transmission of claim 2, wherein the variator continuously changes its torque ratios in both the continuously variable mode and infinitely variable mode to optimize power consumption.

14. The variable transmission of claim 2, wherein only interruptions of power are to change from continuous to infinitely variable mode and to change a gear ratio in the gearbox.

15. The variable transmission of claim 1, wherein a dry clutch is not required between the input shaft and the variator.

16. The variable transmission of claim 1, wherein a torque converter is not required between the input shaft and the variator.

17. The variable transmission of claim 1, further comprising a traction fluid in the variator.

18. A vehicle driveline comprising an engine, a variable transmission of claim 1, and a vehicle output.

19. The variable transmission of claim 6, wherein a power output going to the gearbox can go from reverse speeds to positive speeds through standstill thereby providing the infinitely variable mode.

20. The variable transmission of claim 7, wherein power output going to the gearbox can go from reverse speeds to positive speeds through standstill thereby providing the infinitely variable mode.

* * * * *